United States Patent [19]

Wipasuramonton

[11] Patent Number: 5,566,977
[45] Date of Patent: Oct. 22, 1996

[54] AIR BAG INCLUDING RESTRAINT

[75] Inventor: Pongdet P. Wipasuramonton, Rochester, Mich.

[73] Assignee: TRW Vehicle Safety Systems Inc., Lyndhurst, Ohio

[21] Appl. No.: 457,854

[22] Filed: Jun. 1, 1995

[51] Int. Cl.⁶ .................................................. B60R 21/22
[52] U.S. Cl. ........................ 280/743.1; 280/730.2
[58] Field of Search ............................ 280/728.1, 730.1, 280/730.2, 743.1; 5/458

[56] References Cited

U.S. PATENT DOCUMENTS

| | | | |
|---|---|---|---|
| 2,269,342 | 1/1942 | Johnson | 5/458 |
| 3,008,214 | 11/1961 | Foster et al. | 5/458 |
| 3,792,873 | 2/1974 | Buchner et al. | |
| 3,907,327 | 9/1975 | Pech. | |
| 5,022,110 | 6/1991 | Stroh | 5/458 |
| 5,078,423 | 1/1992 | Fujita. | |
| 5,224,732 | 7/1993 | Warner et al. | 280/730.2 |
| 5,358,273 | 10/1994 | Onishi et al. | |
| 5,390,952 | 2/1995 | Goor | 280/730.1 |

FOREIGN PATENT DOCUMENTS

| | | | |
|---|---|---|---|
| 107983 | 11/1927 | Germany | 5/458 |
| 516751A | 1/1993 | Japan | 280/730.2 |
| 2267065 | 11/1993 | United Kingdom | 280/730.2 |
| 2268128 | 1/1994 | United Kingdom. | |

OTHER PUBLICATIONS

Society of Automotive Engineers, Vehicle Highway Report, SAE J1538 APR8, Glossary of Automotive Inflatable Restraint Terms.

Primary Examiner—Karin L. Tyson
Attorney, Agent, or Firm—Tarolli, Sundheim, Covell, Tummino & Szabo

[57] ABSTRACT

A side impact head air bag (10) includes a plurality of spaced apart restraints (100, 102) for controlling the thickness of the air bag when inflated. In each restraint (100, 102), a circular stitching section (230, 260) joins an inner panel (70) and an outer panel (80) of the air bag (10). The stitching section (230, 260) defines a circular restraint section (200, 202) in each panel (70, 80). The stitching section (230, 260) blocks inflation fluid from flowing between the restraint sections (200, 202) of the restraints (100, 102). The tethers (100, 102) do not extend upon inflation of the air bag (10).

20 Claims, 6 Drawing Sheets

AIR BAG INCLUDING RESTRAINT

BACKGROUND OF THE INVENTION

Technical Field

The present invention relates to a vehicle occupant safety apparatus. In particular, the present invention relates to an inflatable vehicle occupant restraint, such as an air bag, which includes one or more tethers for controlling the shape of the air bag when inflated.

Description of the Prior Art

An inflatable vehicle occupant restraint such as an air bag is used to restrain or protect a vehicle occupant in the event of a vehicle collision requiring such restraint or protection. A typical air bag includes fabric panels which define an inflation fluid volume. When inflation fluid under pressure is supplied to the air bag, the panels move apart from each other as the air bag assumes an inflated condition.

It is known to use tethers extending between the panels of an air bag to control the shape and size of the inflated air bag. The tethers are commonly straps of fabric material disposed inside the air bag and having opposite ends stitched to the air bag panels. When the air bag becomes fully inflated, the tethers are fully extended and stop further movement of the panels away from each other.

An air bag for use in protecting a vehicle occupant in the event of a side impact to the vehicle inflates in the relatively narrow space between the occupant and the vehicle side structure. Multiple tethers are needed to maintain a narrow inflated dimension over the extent of an inflated side impact air bag. It can be relatively difficult and expensive to manufacture an air bag having multiple tethers which are formed as straps of fabric material extending between the panels of the air bag.

SUMMARY OF THE INVENTION

The present invention is an inflatable vehicle occupant restraint such as an air bag for, when inflated, protecting a vehicle occupant. The inflatable restraint has an uninflated condition and an inflated condition. The inflatable restraint comprises a first panel and a second panel each having a central portion, an outer peripheral portion, an inner side surface and an outer side surface. The outer peripheral portions of the first and second panels are sewn together along an outer stitching line to join the first and second panels to form a body portion of the inflatable restraint. When the inflatable restraint is in the inflated condition, the central portions of the first and second panels are at least partially spaced apart from each other and define an inflation fluid volume. A plurality of stitching sections join the central portion of the first panel to the central portion of the second panel at a plurality of spaced apart locations. Each one of the plurality of stitching sections is spaced apart from the other ones of the plurality of stitching sections. Each one of the stitching sections encloses a respective first restraint section of the central portion of the first panel and a respective second restraint section of the central portion of the second panel. Each one of the first restraint sections overlies a corresponding one of the second restraint sections when the inflatable restraint is in the inflated condition. The stitching sections block flow of inflation fluid from the inflation fluid volume between the first restraint sections of the first panel and the second tether sections of the second panel.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

The present invention relates to a vehicle occupant safety apparatus and, in particular, to an inflatable vehicle occupant restraint such as an air bag. The present invention is applicable to various inflatable restraint constructions. As representative of the present invention, FIG. 1 illustrates an inflatable vehicle occupant restraint or air bag 10.

Figure 1:
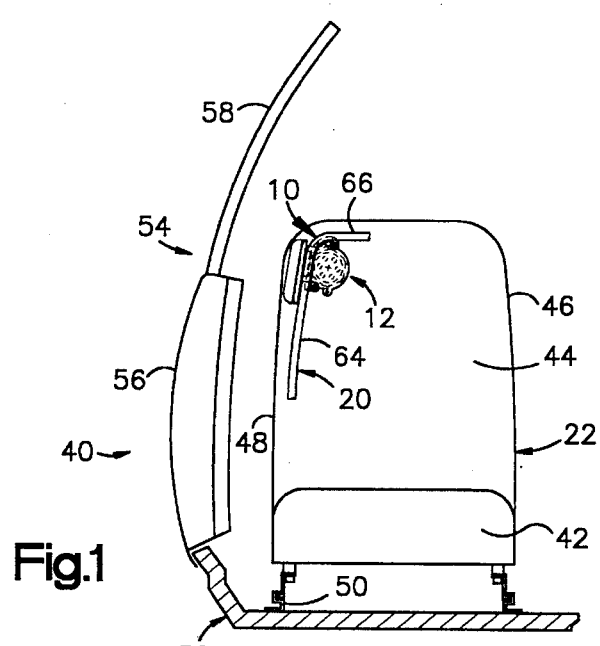
FIG. 1 is a schematic front elevational view showing a vehicle safety apparatus including an inflatable vehicle occupant restraint in accordance with the present invention mounted in a vehicle seat.
Figure 3:
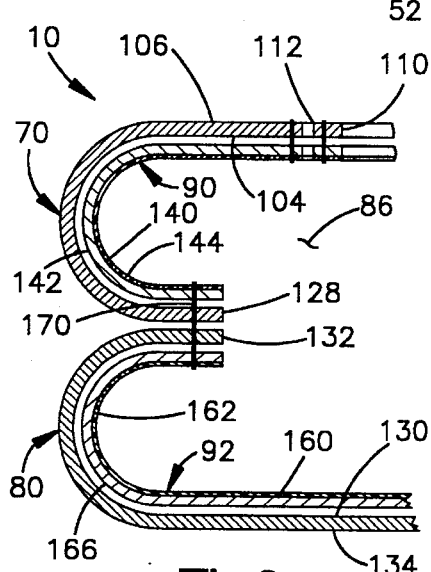
FIG. 3 is a sectional view taken along line 3—3 of FIG. 2.
Figure 4:
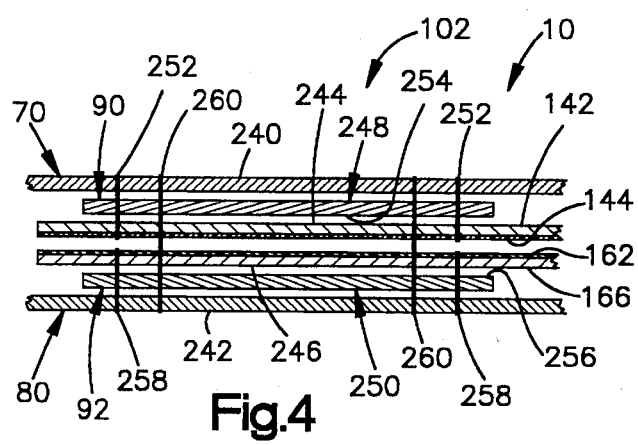
FIG. 4 is a sectional view taken along line 4—4 of FIG. 2.

The air bag 10 is part of an air bag module 12 (FIG. 1). The air bag module 12, described below in more detail with reference to FIGS. 11 and 12, includes an inflator 14 for inflating the air bag 10. A mounting bracket 16 and a base plate 18 secure the air bag 10 and the inflator 14 to a seat frame member 20 of a vehicle seat 22. The air bag module 12 also includes a chute 24 for guiding inflation of the air bag 10, a diffuser 26, and a clamp member or washer 28.

The vehicle seat 22 (FIG. 1) is illustrated as a front passenger seat of a vehicle 40 and includes a seat bottom portion 42 and a seat back 44. The seat back 44 has an inboard side 46 and an outboard side 48. The seat 22 may also include a headrest (not shown) which is supported on or is formed as a portion of the vehicle seat back 44.

The seat 22 is supported by tracks 50 on a body portion 52 of the vehicle 40. The vehicle body 52 also includes a side structure indicated generally at 54. In the illustrated configuration, the vehicle side structure 54 includes a door 56 and a window 58 which are disposed adjacent to the vehicle seat 22. It should be understood that the present invention is applicable to vehicles including other types of side structure, such as a van with no window or door disposed adjacent to the seat 22.

The seat frame member 20 is disposed in the seat back 44 of the vehicle seat 22. The seat frame member 20 has a tubular cross-section and is generally L-shaped in configuration. The L-shaped configuration of the seat frame member 20 is provided by a first leg 64 which extends generally vertically in the seat back 44 and a second leg 66 which extends generally horizontally in the seat back 44.

Figure 5:
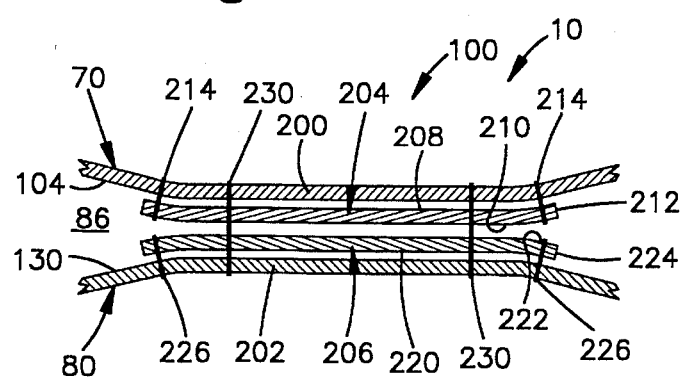
FIG. 5 is a sectional view taken along line 5—5 of FIG. 2.
Figure 6:
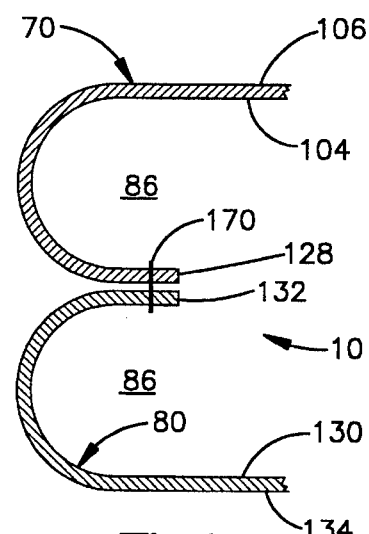
FIG. 6 is a sectional view taken along line 6—6 of FIG. 2.

The air bag 10 is illustrated in FIGS. 2–6 in an uninflated condition (in FIGS. 3–6 the various layers of fabric material in the air bag are shown spaced apart for clarity). The air bag 10 includes an inner panel 70 (FIG. 2) and an outer panel 80, each made of fabric material, which are sewn together to define a body portion 82 and a neck portion 84 of the air bag. The panels 70 and 80 define between them an inflation fluid volume 86 for receiving inflation fluid from the inflator (FIG. 6). The air bag 10 also includes an inner partial panel 90 and an outer partial panel 92 (FIG. 3) which are coated and which extend over the neck portion 84 of the air bag and over only a small part of the body portion 82 of the air bag, as shown in dashed lines in FIG. 2. The air bag 10 further includes a plurality of restraints 100 and 102 for controlling movement of the inner and outer panels 70 and 80 away from each other.

The inner panel 70 (FIG. 2) is a single piece of fabric material, preferably uncoated woven nylon, which has an inner side surface 104 (FIG. 6) and an opposite outer side surface 106. An outer peripheral edge 128 of the inner panel 70 extends between the inner and outer side surfaces 104 and 106. The inner panel 70 includes a narrow neck portion 108 (FIG. 2) in which is formed an inflator opening 110. Six fastener openings 112 in the form of rectangular slots are disposed in a circular array around the inflator opening 110, for securing the air bag 10 in the module 12 in a manner described below.

The neck portion 108 of the inner panel 70 merges into a generally rectangular body portion 114 of the inner panel. The body portion 114 includes a central portion 116 with which the eight restraints 100, 102 are connected. A C-shaped outer peripheral portion 120 of the body portion 114 surrounds the central portion 116. The C-shaped outer peripheral portion 120 includes an upper side section 122 which is disposed above the restraints 100 and 102 as viewed in FIG. 2, a lower side section 124 disposed below the tethers as viewed in FIG. 2, and an outer end section 126 disposed at the left or outer end of the air bag 10 as viewed in FIG. 2.

The outer panel 80 (not seen in FIG. 2, but seen in part in FIGS. 3–6) does not include an inflator opening or fastener openings but is otherwise identical to the inner panel 70. The outer panel 80 may include one or more known vents (not shown) for venting inflation fluid from the inflation fluid volume 86 in a known manner. The outer panel 80 has an inner side surface 130 (FIG. 6) which is presented toward the inner side surface 104 of the inner panel. An outer peripheral edge 132 of the outer panel 80 extends between the inner side surface 130 and an opposite outer side surface 134 of the outer panel.

The inner partial panel 90 (FIG. 2) is made from a single piece of fabric material having an inner side surface 140 (FIG. 3) and an outer side surface 142. The inner partial panel 90 is preferably made from woven nylon. A coating or layer 144 of fluid impermeable material such as neoprene is disposed on the inner side surface 140 of the inner partial panel 90.

A neck portion 146 (FIG. 2) of the inner partial panel 90 is co-extensive with the neck portion 108 of the inner panel 70. The neck portion 146 of the inner partial panel 90 has an inflator opening and fastener openings which are co-extensive with those on the inner panel 70. A body portion 148 of the inner partial panel 90 extends over only a part of the body portion 82 of the inner panel 70. The body portion 148 of the inner partial panel 90 is defined generally by a series of straight edges 150, 152, 154 and 156.

The outer partial panel 92 (FIG. 3) underlies and is substantially identical to the inner partial panel 90 but does not include an inflator opening or fastener openings. The outer partial panel 92 has an inner side surface 160 and an outer side surface 166. The inner side surface 160 of the outer partial panel 92 is presented toward the inner side surface 140 of the inner partial panel 90. A coating 162 of fluid impermeable material such as neoprene is disposed on the inner side surface 160 of the outer partial panel 92.

An outer stitching line 170 (FIGS. 2 and 3) joins the inner panel 70, the outer panel 80, the inner partial panel 90, and the outer partial panel 92. The outer stitching line 170 includes a series of stitches which extend completely around the outer periphery of the air bag 10. Because the outer stitching line 170 is sewn when the panels are inverted or "inside out" from the condition shown in the drawings, the outer peripheral edges 128 and 132 of the panels 70 and 80, respectively, lie between the inner side surfaces 104 and 130 of the panels when they are turned "right side out" after sewing.

The body portion 82 (FIG. 2) of the air bag 10 includes the body portion 114 of the inner panel 70 as well as the body portion of the outer panel 80. The body portion 82 of the air bag 10 has an outer peripheral portion 180 which includes the C-shaped outer peripheral portion 120 of the inner panel 70 and the C-shaped outer peripheral portion of the outer panel 80. The body portion 82 of the air bag 10 further includes a central portion 182 which includes the central portion 116 of the inner panel 70 and the central portion of the outer panel 80, as well as the leftmost (as viewed in FIG. 2) parts of the inner and outer partial panels 90 and 92. The neck portion 84 of the air bag 10 includes the neck portion 108 of the inner panel 70 and the neck portion of the outer panel 80, as well as the neck portions of the inner and outer partial panels 90 and 92.

The restraints 100 and 102 are enclosed within the outer stitching line 170 and are disposed in the central portion 182 of the body portion 82 of the air bag 10. The restraints 100 and 102 interconnect the inner panel 70 and the outer panel 80 to control movement of the panels 70 and 80 away from each other. In the illustrated air bag 10, the six restraints 100, which are identical to each other, join the inner and outer panels 70 and 80 but do not join the inner and outer partial panels 90 and 92. The two restraints 102, which are identical to each other, join the inner and outer partial panels 90 and 92 as well as the inner and outer panels 70 and 80.

Figure 2:
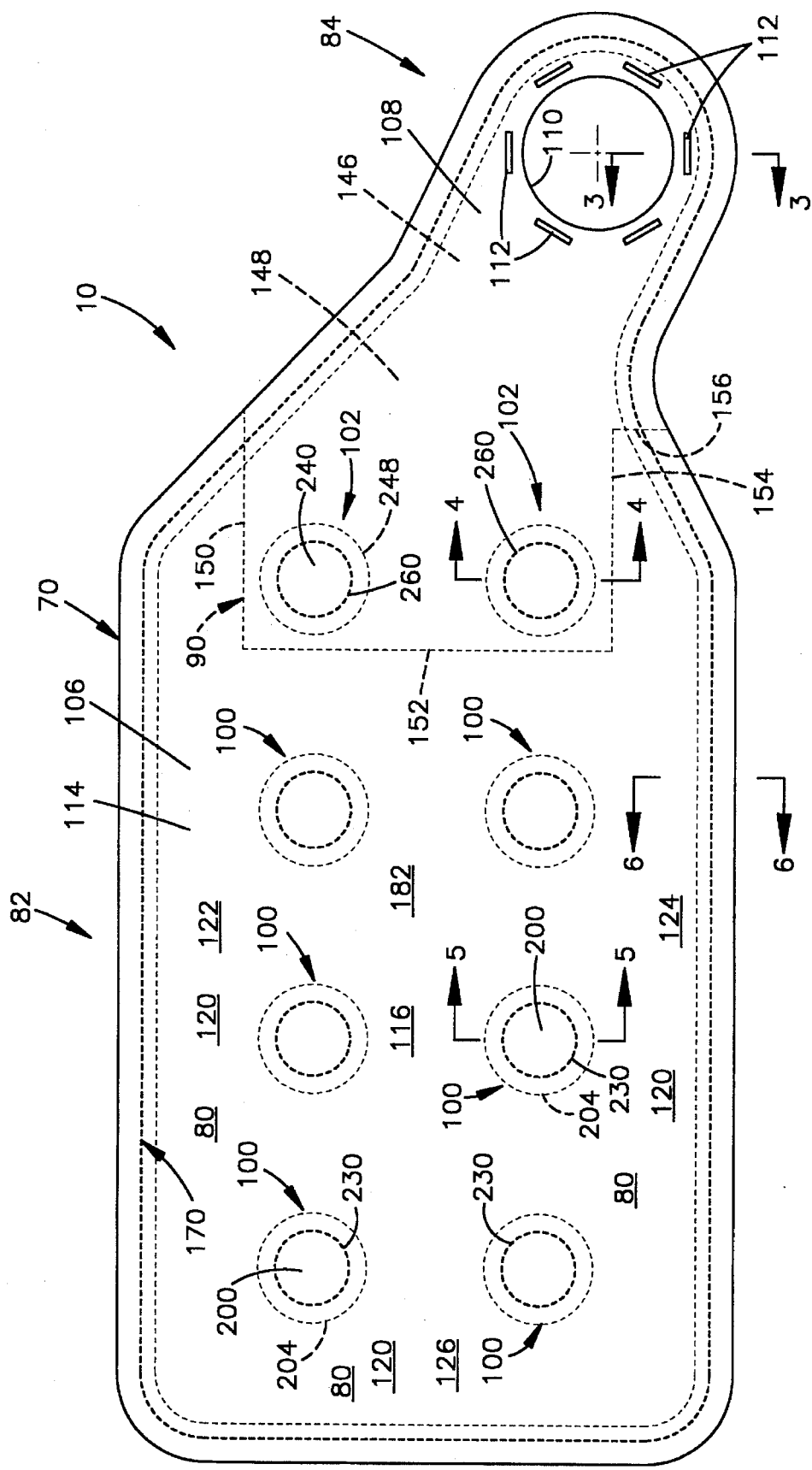
FIG. 2 is an elevational view of the inflatable vehicle occupant restraint of FIG. 1 in an unfolded condition.
Figure 7:
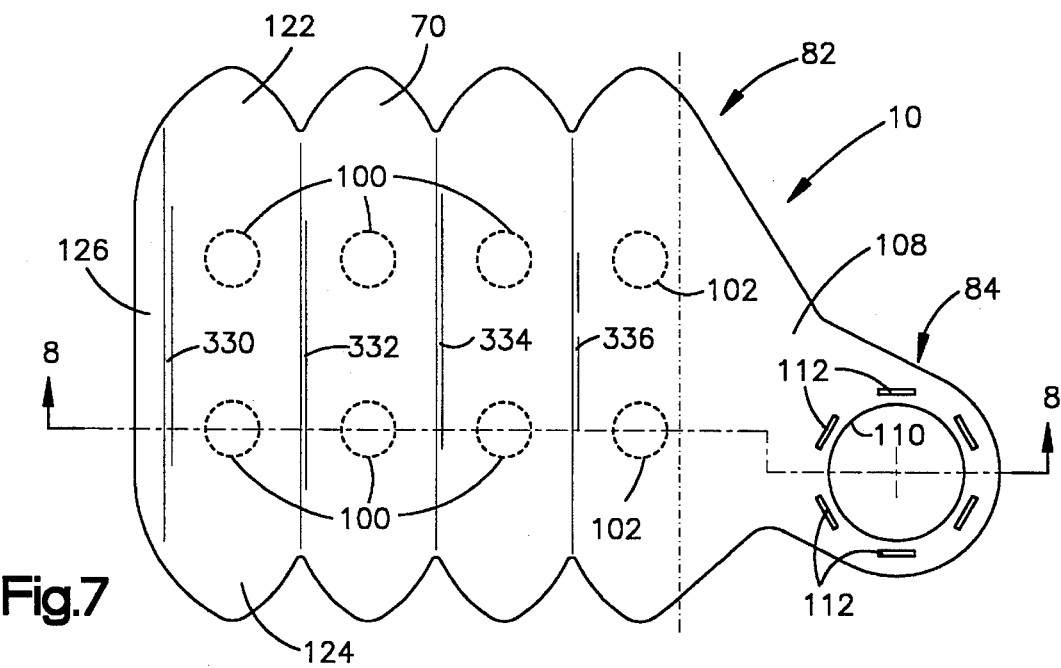
FIG. 7 is an elevational view of the inflatable vehicle occupant restraint of FIG. 1 showing a first step in a process of folding the inflatable restraint.

An exemplary restraints 100, as best seen in FIGS. 2 and 5, includes a circular restraint section 200 of the inner panel 70, a circular restraint section 202 of the outer panel 80, two fabric reinforcing pads 204 and 206, and several stitching sections joining the various fabric portions.

The inner reinforcing pad 204 (FIGS. 2 and 5) is circular in configuration and includes opposite first and second side surfaces 208 and 210 (FIG. 5) and a circular outer peripheral edge 212. The inner reinforcing pad 204 is disposed between the inner and outer panels 70 and 80, at a location adjacent to the inner panel 70. The first side surface 208 of the inner reinforcing pad 204 overlies and is in abutting engagement with the inner side surface 104 of the inner panel 70. A circular stitching section 214 at the outer periphery of the inner reinforcing pad 204 joins the inner reinforcing pad to the inner panel 70.

The outer reinforcing pad 206 is identical to the inner reinforcing pad 204. Thus, the outer reinforcing pad 206 is circular in configuration and has opposite first and second side surfaces 220 and 222 and a circular outer peripheral edge 224. The outer reinforcing pad 206 is disposed between the inner and outer panels 70 and 80 at a location adjacent to the outer panel 80. The first side surface 220 of the outer reinforcing pad 206 overlies and is in abutting engagement with the inner side surface 130 of the outer panel 80. The outer reinforcing pad 206 is sewn at its outer periphery to the outer panel 80 with a circular stitching section 226.

The reinforcing pads 204 and 206 are sewn to the inner and outer panels 70 and 80, respectively, when the panels 70 and 80 are inverted or "inside out" from the condition shown in the drawings. After the inner panel 70 and the outer panel 80 are sewn with the outer stitching line 170, the inner and outer panels are inverted or turned "right side out" into the condition shown in the drawings. The inner and outer panels 70 and 80, together with the inner and outer reinforcing pads 204 and 206, are then sewn to each other with a circular stitching section 230 to form the restraint 100.

The stitching section 230 includes a series of stitches arranged in a circular pattern which extend through the inner panel 70, the inner reinforcing pad 204, the outer reinforcing pad 206, and the outer panel 80. The stitching section 230 encloses and defines the circular restraint section 200 of the inner panel 70. The stitching section 230 similarly encloses and defines the circular restraint section 202 of the outer panel 80.

The circular restraint section 200 of the inner panel 70 overlies the circular restraint section 202 of the outer panel 80. The second side surface 210 of the inner reinforcing pad 204 overlies and is in abutting engagement with the second side surface 222 of the outer reinforcing pad 206. The circular stitching section 230 blocks flow of inflation fluid from the inflation fluid volume 86 to a location between the restraint section 200 of the inner panel 70 and the restraints section 202 of the outer panel 80.

Each one of the six restraints 100 includes an identical circular stitching section 230. Each restraint 100 is spaced apart from the other restraints 100. Thus, each one of the stitching sections 230 is spaced apart from the other stitching sections 230.

Each restraint 102 (FIGS. 2 and 4) includes a circular restraint section 240 of the inner panel 70 and a circular restraint section 242 of the outer panel 80. Each restraints 102 also includes a circular restraint section 244 of the inner partial panel 90, a circular restraint section 246 of the outer partial panel 92, and two fabric reinforcing pads 248 and 250. A plurality of stitching sections join together these various fabric portions.

The inner reinforcing pad 248 (FIG. 4) is identical to the reinforcing pads 204 and 206 illustrated in FIG. 5. A first side surface 254 of the inner reinforcing pad 248 overlies and is in abutting engagement with the uncoated outer side surface 142 of the inner partial panel 90. The inner reinforcing pad 248 is sewn between the inner panel 70 and the inner partial panel 90 with a circular stitching section 252 extending around the outer periphery of the pad 248.

The outer reinforcing pad 250 is identical to the inner reinforcing pad 248. A first side surface 256 of the outer reinforcing pad 250 overlies and is in abutting engagement with the uncoated outer side surface 166 of the outer partial panel 92. The outer reinforcing pad 250 is sewn between the outer panel 80 and the outer partial panel 92 with a circular stitching section 258 which extends around the outer periphery of the pad 250.

A circular stitching section 260 joins the inner and outer panels 70 and 80, the inner and outer partial panels 90 and 92, and the reinforcing pads 248 and 250. The stitching section 260 encloses and defines the circular restraint section 240 of the inner panel 70, and encloses and defines the circular restraint section 242 of the outer panel 80. The stitching section 260 blocks flow of inflation fluid from the inflation fluid volume 86 to a location between the restraint section 240 of the inner panel 70 and the restraint section 242 of the outer panel 80.

The restraint section 240 of the inner panel 70 overlies the restraint section 242 of the outer panel 80. The coating 144 on the inner side surface 140 of the inner partial panel 90 overlies and is in abutting engagement with the coating 162 on the inner side surface 160 of the outer partial panel 92.

Figure 11:
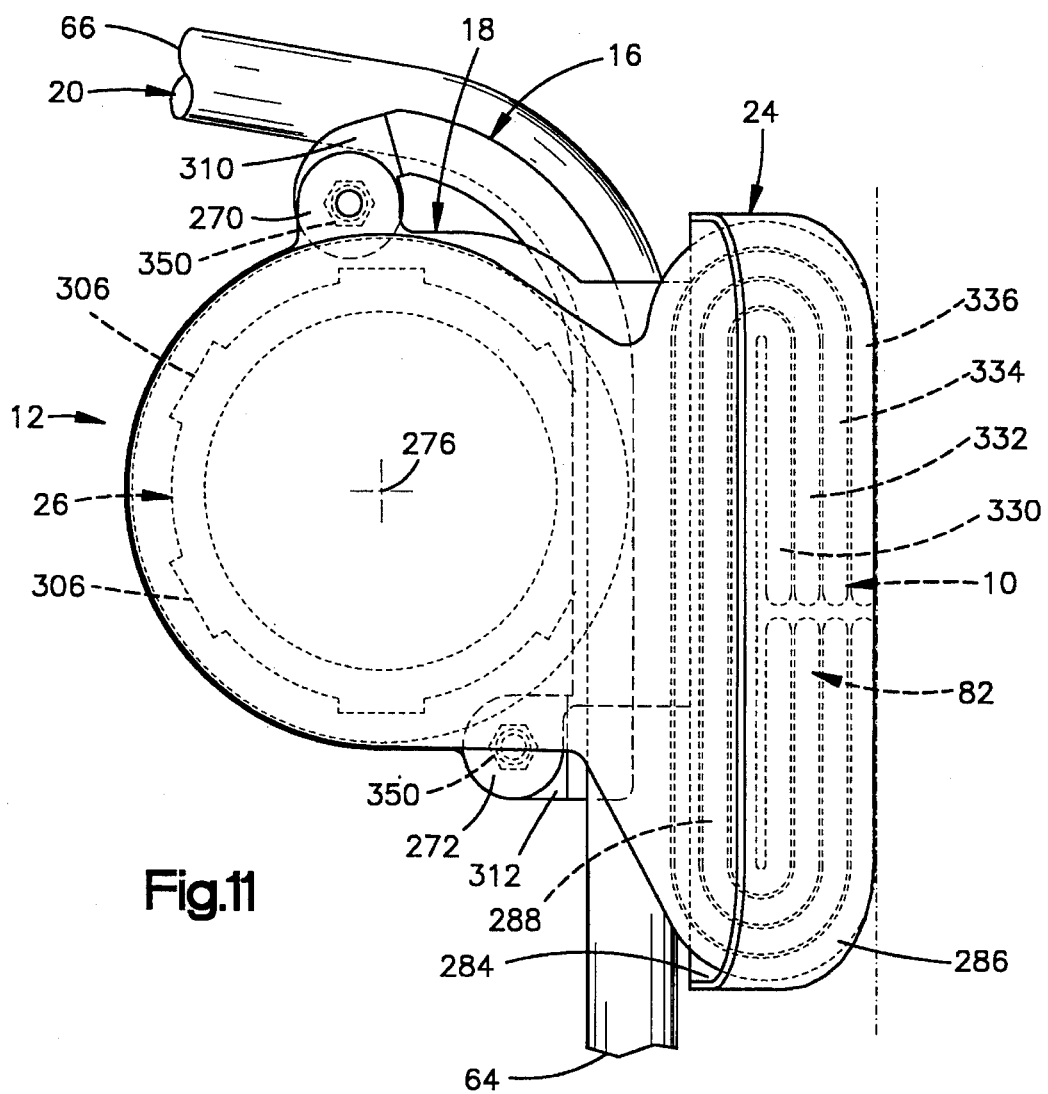
FIG. 11 is a rear elevational view of the vehicle safety apparatus of FIG. 1.
Figure 12:
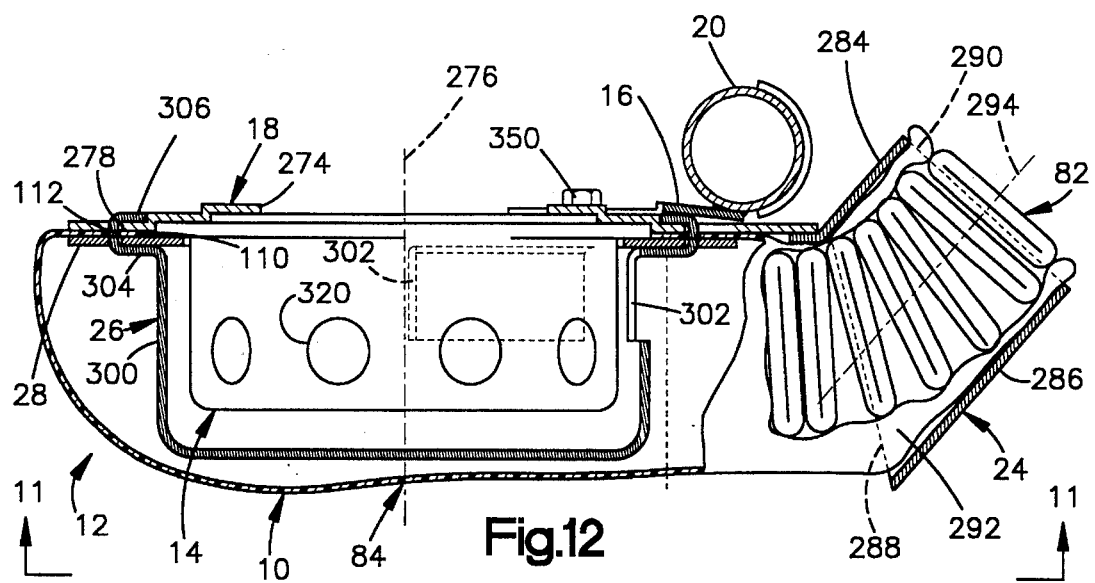
FIG. 12 is a sectional view of the vehicle safety apparatus of FIG. 1.

After the air bag 10 is completely sewn and assembled, the air bag is assembled with the other parts of the air bag module 12 as seen in FIGS. 11 and 124 (In FIG. 12, the air bag 10 is shown, for clarity, as being made from only one layer of uncoated fabric material.)

The base plate 18 (FIGS. 11 and 12) of the air bag module 12 is a generally planar sheet metal stamping. The base plate 18 includes two radially projecting mounting ears 270 and 272 (FIG. 11), each having a respective fastener opening. An annular axially extending inner edge surface 274 (FIG. 12) of the base plate 18 defines a circular central opening in the base plate 18. The central opening is centered on an axis 276. Six identical mounting slots 278 in the base plate 18 are equally spaced in a circular array centered on the axis 276. The slots 278 have the same configuration as the fastener openings 112 in the neck portion 108 of the inner panel 70 of the air bag 10.

The chute 24 is welded to the base plate 18 but could alternatively be formed as one piece with the base plate 18. The chute 24 has a wide, flat tubular configuration and includes an inner side wall 284 and an outer side wall 286. The walls of the chute 24 define an inlet opening 288 and an outlet opening 290 of the chute. A chamber or passage 292, enclosed within and defined by the walls of the chute 24, extends between the inlet opening 288 and the outlet opening 290 of the chute 24. The chute 24 has a central axis 294 which extends parallel to the chute walls 284 and 286. The chute axis 294 extends between the inlet opening 288 and the outlet opening 290 at an angle to the plane of the base plate 18.

The diffuser 26 is a one-piece generally cup-shaped member and includes a cylindrical axially extending side wall 300 which is centered on the axis 276 of the module 12. A plurality of spaced apart fluid flow openings 302 (FIG. 12) are formed in the side wall of the diffuser 26 between the inflator 14 and the chute 24. An annular mounting flange 304 of the diffuser 26 extends radially outward from the diffuser side wall 300. Six identical mounting tabs 306 project axially from the mounting flange 304 of the diffuser 26. The mounting tabs 306 are equally spaced in a circular array centered on the axis 276. Each mounting tab 306 has a rectangular configuration sized to fit through the mounting slots 278 in the base plate 18 and through the fastener openings 112 in the air bag 10.

The washer 28 (FIG. 12) is a flat, annular piece of metal having parallel radially extending inner and outer side surfaces. Six identical mounting slots unnumbered) in the washer 28 are equally spaced in a circular array centered on the axis 276 for receiving the mounting tabs 306 on the diffuser 26. Each mounting slot in the washer 28 has the same rectangular configuration as the mounting slots 278 in the base plate 18.

The mounting bracket 16 is a single piece of sheet metal stamped and formed to a generally J-shaped configuration as best seen in FIG. 11. The mounting bracket 16 is generally planar and includes a first end portion 310 and a second end portion 312, each having a fastener opening.

The inflator 14 is a known pyrotechnic air bag inflator having a plurality of gas outlet openings 320. A radially extending mounting flange of the inflator 14 has parallel inner and outer side surfaces. Lead wires (not shown) extend from the inflator 14. The lead wires are connected to electric circuitry (not shown) of the vehicle including a collision sensor and a power source such as the vehicle battery.

The air bag module 12 is assembled by first moving the diffuser 26 and the washer 28 through the inflator opening 110 in the neck portion 108 of the inner panel 70 of the air bag 10 to a position inside the air bag. The diffuser 26 is engaged with the washer 28 so that the mounting tabs 306 on the diffuser extend through the mounting slots (unnumbered) in the washer. The diffuser 26 and the washer 28 are positioned within the air bag 10 so that the mounting tabs 306 on the diffuser also extend through the fastener openings 112 in the neck portion 84 of the air bag. The washer 28 is thus disposed between the mounting flange 304 of the diffuser 12 and the air bag 10. The mounting tabs 306 on the diffuser 26 extend only axially and are not yet bent radially inward as shown in FIGS. 11 and 12.

The inflator 14 is inserted axially into the air bag 10 through the inflator opening 110 to a position within the side wall 300 of the diffuser 26. The mounting flange on the inflator 14 engages a portion of the washer 28. The base plate 18 is next positioned against the air bag 10 and the inflator 14 so that the mounting tabs 306 on the diffuser 26 extend through the mounting slots 278 in the base plate. The projecting end portions of the mounting tabs 306 on the diffuser 26 are thereafter bent radially inward so as to overlie the base plate 18, as seen in FIG. 12. The mounting tabs 306 on the diffuser 26 clamp together the base plate 18, the air bag 10, the washer 28, the inflator 14 and the diffuser 26.

Figure 8:
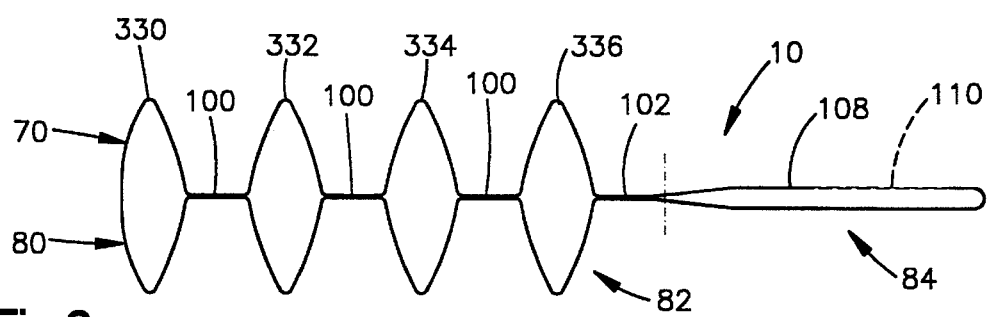
FIG. 8 is a sectional view taken along line 8—8 of FIG. 7.

The air bag 10 is folded and stored in the chamber 292 in the chute 24 in the manner shown schematically in FIGS. 7–10. A series of pleats 330, 332, 334, and 336 are formed in the body portion 82 of the air bag 10. The pleats 330–336 are formed by moving the material of the inner panel 70 apart from the material of the outer panel 80 as best seen in FIG. 8. The pleats 330–336 are formed between the restraints 100, 102 and extend from the upper side portion 122 of the air bag 10 to the lower side portion 124 of the air bag.

Figure 9:
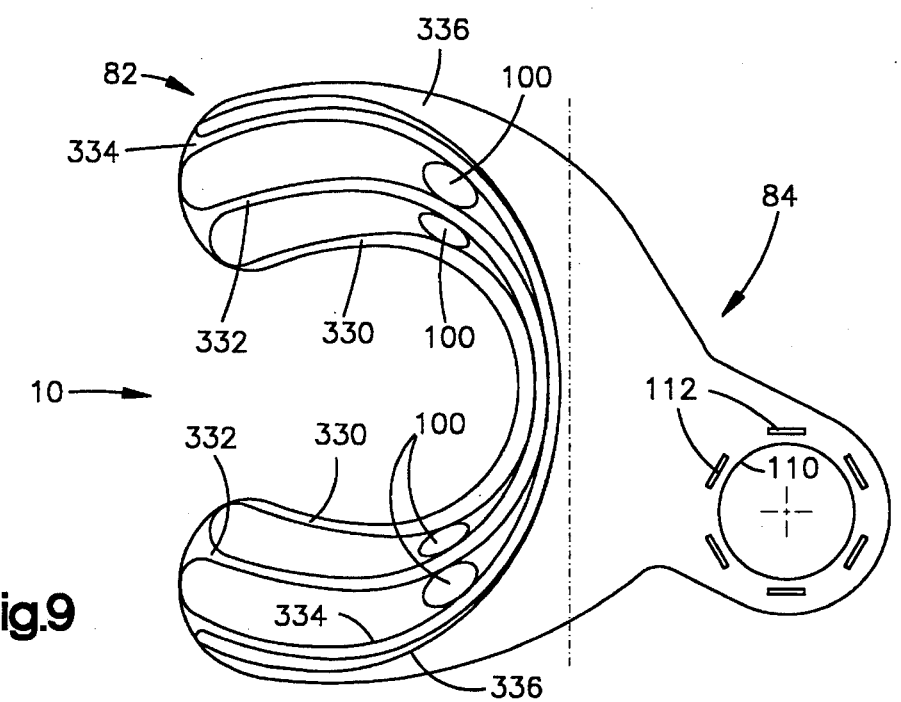
FIG. 9 is an elevational view of the inflatable vehicle occupant restraint of FIG. 1 showing a further step in the process of folding the inflatable restraint.
Figure 10:
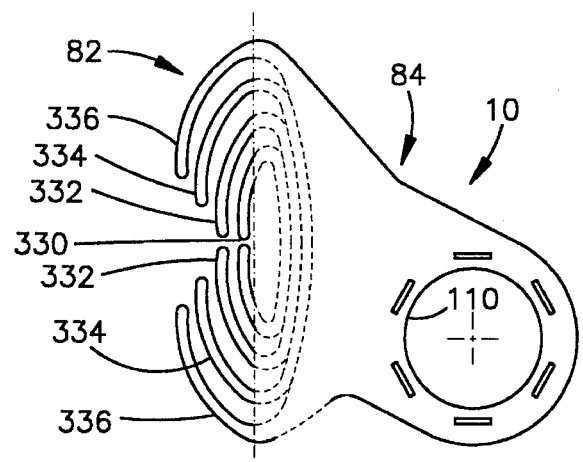
FIG. 10 is an elevational view of the inflatable vehicle occupant restraint of FIG. 1 showing a still further step in the process of folding the inflatable restraint.

The body portion 82 of the air bag 10 is thereafter pushed or tucked inside the neck portion 84 of the air bag as shown in FIGS. 9 and 10, in a direction to the right as viewed in FIG. 9. Specifically, the fabric material which forms the neck portion 108 of the inner panel 70 of the air bag 10 is moved apart from the fabric material which forms the neck portion of the outer panel 80 of the air bag, to form a pouch or sack into which the body portion 82 of the air bag is moved. The body portion 82 of the air bag 10 is folded along the pleats 330–336 so that the upper and lower (as viewed in FIGS. 9 and 10) side portions of the air bag wrap around and enclose the outer end portion.

When the air bag 10 is folded in this manner, substantially all of the folded body portion 82 of the air bag is stored in the chute 24 as best seen in FIGS. 11 and 12. Some of the folded body portion 82 of the air bag 10 may be located between the chute 24 and the diffuser 26. Preferably only a minimal amount, or even none, of the folded body portion 82 of the air bag 10 projects beyond the outlet opening 290 of the chute 24. The neck portion 84 of the air bag 10 extends around and wraps around the inflator 14 and the diffuser 26 as best seen in FIG. 12. The neck portion 84 of the air bag 10 is connected with the base plate 18 at a location spaced from and outside of the chute 24.

To secure the assembled air bag module 12 in the vehicle seat back 44, the mounting bracket 16 is first welded to the seat frame member 20. The base plate 18 of the assembled air bag module 12 is thereafter secured to the mounting bracket 16 with fasteners 350 (FIG. 12) through the mounting portions 310 and 312 of the mounting bracket and through the fastener openings in the mounting ears 270 and 272 of the base plate. As a result, the base plate 18, the inflator 14, the air bag 10, the chute 24, the diffuser 26, and the washer 28 are securely fastened to the seat frame member 20.

The air bag module 12, when mounted to the seat frame member 20, is disposed within a cavity in the foam material (not shown) of the vehicle seat back 44. The cavity is large enough so as not to prevent the flow of inflation fluid from the inflator 14 through the neck portion 84 of the air bag 10 into the body portion 82 of the air bag. The chute 24, along with the body portion 82 of the air bag 10, is covered from the outside of the seat back 44 by the foam material and by the fabric material outer covering of the seat back. The foam material and the fabric material covering are selected and installed so as not to prevent inflation of the air bag 10 into the space between the vehicle seat 22 and the vehicle side structure 54.

In the event of a side impact to the vehicle 40 of a magnitude sufficient to require protection of the vehicle occupant, the vehicle electric circuitry including the collision sensor sends an electric current to the inflator 14. The inflator 14 is actuated in a known manner and directs inflation fluid under pressure into the diffuser 26. The walls of the diffuser 26 direct the inflation fluid through the fluid flow openings 302 in the diffuser and into the neck portion 84 of the air bag 10. The neoprene layers 144 and 162 on the inner and outer partial panels 90 and 92 of the air bag 10 prevent inflation fluid from leaking out of the neck portion 84 of the air bag.

The neck portion 84 of the air bag 10 directs the inflation fluid from the diffuser 26 into the body portion 82 of the air bag. The body portion 82 of the air bag 10 inflates from the folded, stored condition shown in FIGS. 11 and 12 to an inflated condition as shown schematically in FIG. 13, adjacent to the vehicle side structure 54, to protect the vehicle occupant. The chute 24 guides the air bag 10 to inflate in the direction of the chute axis 294. The body portion 82 of the air bag 10 inflates forward and outward relative to the vehicle seat back 44 between the head of an occupant of the vehicle seat 22 and the side structure 40 of the vehicle 40.

The pressure of the inflation fluid in the inflation fluid volume 86 in the air bag 10 causes the inner panel 70 and the outer panel 80 to move away from each other as the air bag assumes an inflated condition. As this relative movement of the panels 70 and 80 occurs, the restraints 100 and 102 resist movement of the inner panel and the outer panel away from each other. Because of the fluid pressure in the air bag 10 between the panels 70 and 80, a tensile load is placed on the restraints 100 and 102 in a direction extending between the inner panel 70 and the outer panel 80. The restraints 100 and 102 do not extend, and thus the restraints limit and define the thickness or inflated dimension of the air bag 10 as measured between the inner panel 70 and the outer panel 80.

Figure 13:
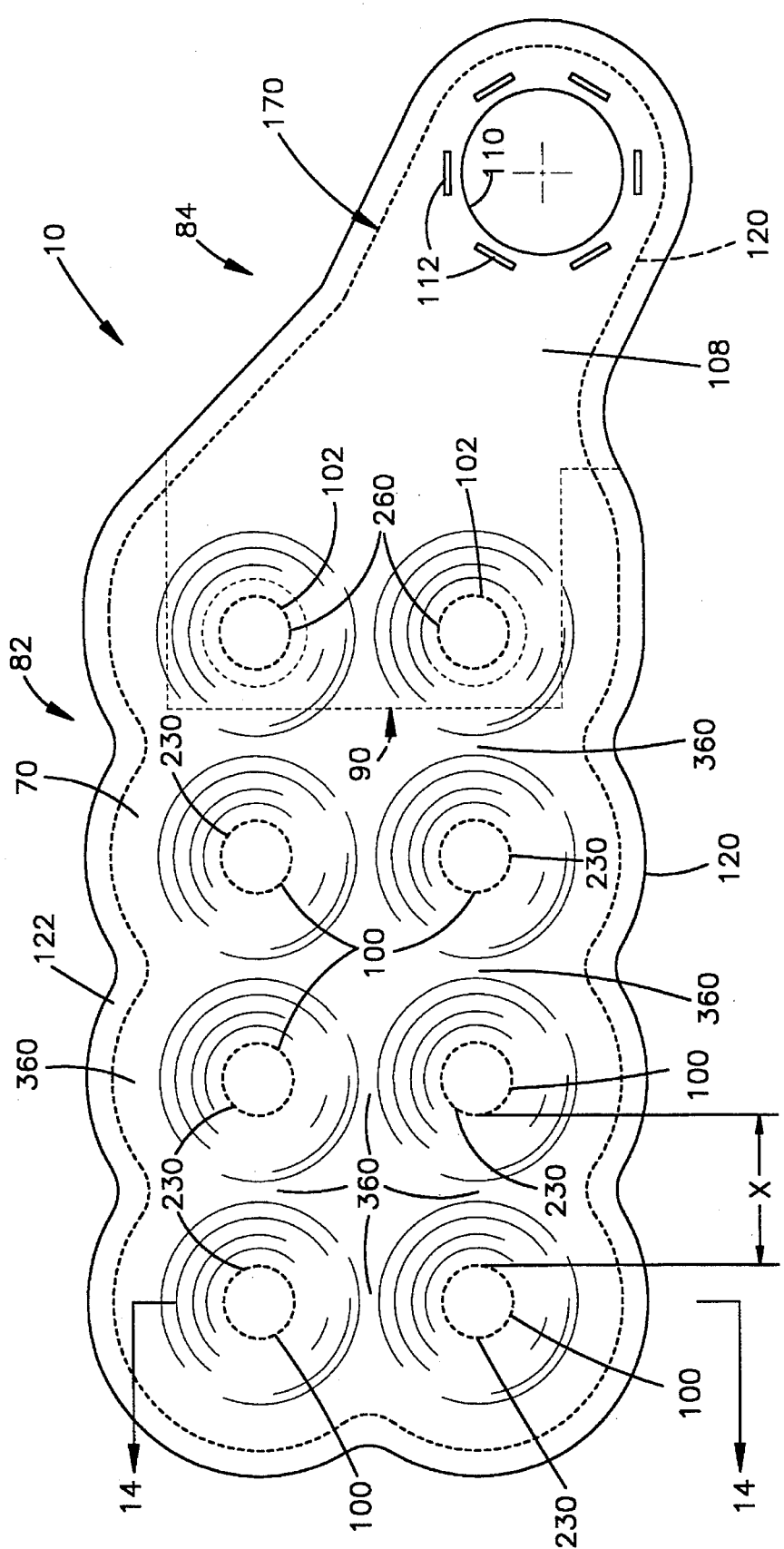
FIG. 13 is a view similar to FIG. 2 showing the inflatable restraint in an inflated condition.

The restraints 100 and 102 are arranged spaced apart in a grid-like pattern over the body portion 82 of the air bag 10, as best seen in FIGS. 2 and 13. The thickness of the air bag 10, when inflated, at the location of the restraints 100 and 102, is effectively zero. That is, there is no inflation fluid between the tether sections of the inner panel 70 and the tether sections of the outer panel 80 at these locations of the restraints 100 and 102. Also, the thickness of the air bag 10 at the outer stitching line 170, when inflated, is effectively zero because the inner panel 70 and the outer panel 80 are sewn together in abutting engagement at the outer stitching line.

Figure 14:
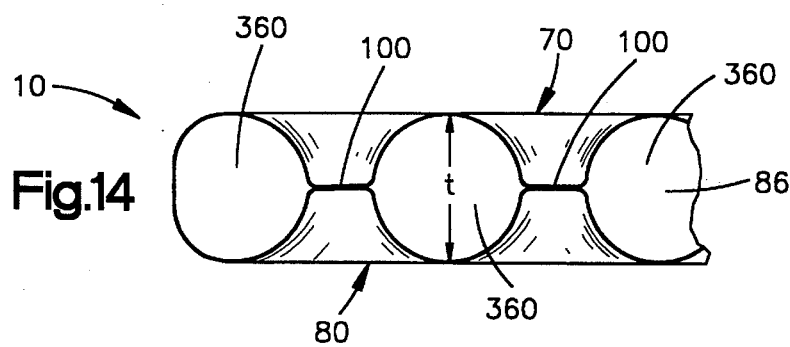
FIG. 14 is a sectional view taken along line 14—14 of FIG. 13.

At other locations on the body portion 82, the air bag 10, when inflated, has a measurable and substantial thickness. That is, at these other locations, the inner panel 70 and the outer panel 80 are held apart from each other by the inflation fluid and define between them an interconnected series of sections 360 of the single inflation fluid volume 86, as best seen in FIG. 14. In these inflation fluid sections 360, the body portion 82 of the air bag 10 attempts to assume a spherical shape as the inflation fluid forces apart the inner panel 70 and the outer panel 80.

The spacing between adjacent restraints 100 and/or 102 is selected and determined in accordance with the equation:

$$X = \frac{(\pi)t}{2} \quad (1)$$

where "X" (FIG. 13) is the distance between a pair of adjacent stitching sections 230 and/or 260, and "t" (FIG. 14) is the thickness when inflated of the air bag section 360 disposed between those stitching sections 230 and/or 260. The spacing between each restraint 100 or 102 and the outer stitching line 170 is also determined in accordance with the same equation. In that case, "X" in Equation 1 represents the perpendicular distance between the outer stitching line 170 and the stitching section 230 and/or 260. The restraints 100 and 102 are arranged on the air bag 10 so that the overall thickness of the inflated portions of the air bag 10 is substantially uniform over the extent of the body portion 82.

The restraints 100 and 102 are advantageous in that they do not require the sewing of elongate fabric strips between the inner and outer panels 70 and 80. The only internal parts of the restraints 100 and 102, i.e., the reinforcing pads 204, 206, 248, and 250, are sewn to the panels 70 and 80 from the outside. This construction greatly simplifies the fabrication of the air bag 10, especially in view of the fact that multiple restraints are used.

Figure 15:
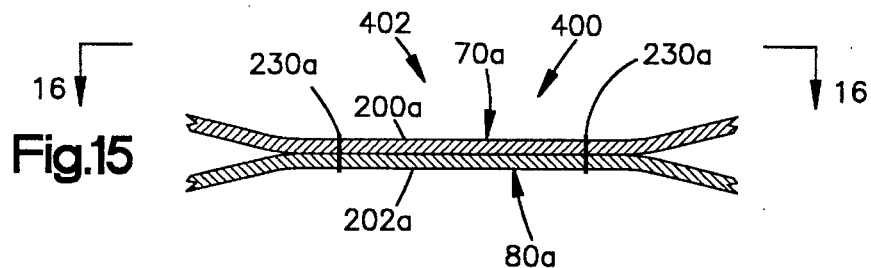
FIG. 15 is a view similar to FIG. 5 of a portion of an inflatable restraint in accordance with a second embodiment of the present invention.
Figure 16:
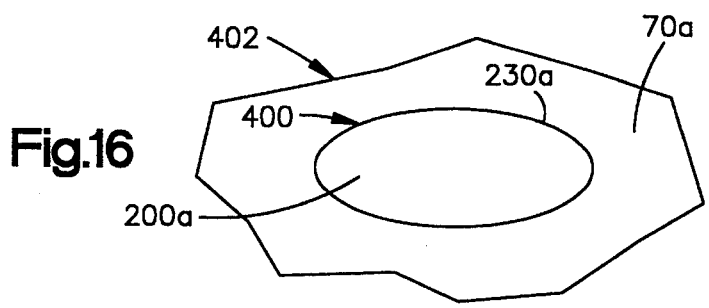
FIG. 16 is a view taken along line 16—16 of FIG. 15.

FIGS. 15 and 16 illustrate a restraints 400 which is included in an air bag 402 constructed in accordance with a second embodiment of the present invention. The air bag 402 is generally similar to the air bag 10, and similar parts are given similar reference numerals. The air bag 402 includes an inner panel 70*a* and an outer panel 80*a*. The restraint assembly 400 does not include any reinforcing pads between the inner panel 70*a* the outer panel 80*a*. Thus, a stitching section 230*a* joins the inner panel 70*a* in abutting engagement with the outer panel 80*a*. The stitching section 230*a* is elliptical rather than circular in configuration. The stitching section 230*a* encloses and defines an elliptical restraint section 200*a* of the inner panel 70*a* and an elliptical restraint section 202*a* of the outer panel 80*a*.

From the above description of the invention, those skilled in the art will perceive improvements, changes and modifications in the invention. For example, the stitching sections in the restraints can have a configuration other than circular or elliptical. Also, the coated partial panels need not be incorporated in the air bag. Such improvements, changes and modifications within the skill of the art are intended to be covered by the appended claims.

Having described the invention, I claim:

1. An inflatable vehicle occupant restraint such as an air bag for, when inflated, protecting a vehicle occupant, said inflatable restraint having an uninflated condition and an inflated condition, said inflatable restraint comprising:

a first panel having a central portion and an outer peripheral portion;

a second panel having a central portion and an outer periphery portion;

said outer peripheral portions of said first and second panels being sewn together along an outer stitching line to join said first and second panels to form a body portion of said inflatable restraint;

said central portions of said first and second panels being at least partially spaced apart from each other when said inflatable restraint is in the inflated condition to define an inflation fluid volume between said central portions of said first and second panels; and a plurality of non-extensible assemblies disposed within said outer stitching line and joining said central portion of said first panel to said central portion of said second panel at a plurality of spaced apart locations to control the width of said inflation fluid volume as measured between said first and second panels, each one of said assemblies comprising:

(a) a first section of said central portion of said first panel;

(b) a second section of said central portion of said second panel; and a stitching section extending around and enclosing said first section and said second section, said stitching section joining said first section to said second section in an overlying relationship, said stitching section blocking flow of inflation fluid from said inflation fluid volume between said first section and said second section.

2. An inflatable restraint as set forth in claim 1 wherein said first section is in abutting engagement with said second section in each respective one of said assemblies.

3. An inflatable restraint as set forth in claim 1 wherein said stitching section comprises a series of stitches arranged in a circular pattern, each one of said first and second sections having a circular configuration.

4. An inflatable restraint as set forth in claim 1 wherein each one of said assemblies includes at least one reinforcing pad disposed intermediate said first section and second section, said reinforcing pad being in abutting engagement with one of said first and second sections.

5. An inflatable restraint as set forth in claim 4 wherein each one of said assemblies includes a first reinforcing pad sewn to and overlying said first section of said first panel and a second reinforcing pad sewn to and overlying said second section of said second panel, said first and second reinforcing pads being disposed intermediate said first and second sections, said first reinforcing pad overlying said second reinforcing pad, said stitching section joining said first and second reinforcing pads to said first and second sections.

6. An inflatable restraint as set forth in claim 4 wherein said stitching section comprises a series of stitches arranged in a circular pattern, each one of said first and second sections having a circular configuration.

7. An inflatable restraint as set forth in claim 1 wherein said inflatable restraint has a single continuous inflation fluid volume including a plurality of sections which are interconnected in fluid communication and between which said assemblies are disposed, said assemblies and said outer stitching section defining said plurality of inflation fluid volume sections.

8. An inflatable restraint as set forth in claim 7 wherein said sections of said inflation fluid volume which are disposed between adjacent assemblies, when inflated, have substantially the same thickness as said sections of said inflation fluid volume which are disposed between said assemblies and said outer stitching line.

9. An inflatable restraint as set forth in claim 1 wherein said assemblies are arranged spaced apart in a grid-like pattern over said body portion of said air bag, each pair of adjacent assemblies defining between them a section of said body portion of said air bag having a thickness when inflated, the distance between a pair of adjacent assemblies being determined in accordance with the equation:

$$X = \frac{(\pi)t}{2} \qquad (1)$$

where X is the distance between said adjacent stitching sections, and t is the thickness when inflated of said section of said body portion of said air bag between said adjacent stitching sections.

10. An inflatable vehicle occupant restraint such as an air bag for, when inflated, protecting a vehicle occupant, said inflatable restraint having an uninflated condition and an inflated condition, said inflatable restraint comprising:

a first panel having a central portion, an outer peripheral portion, an inner side surface and an outer side surface;

a second panel having a central portion, an outer peripheral portion, an inner side surface and an outer side surface;

said outer peripheral portions of said first and second panels being sewn together along an outer stitching line to join said first and second panels to form a body portion of said inflatable restraint, said inner side surface of said first panel being presented toward said inner side surface of said second panel;

said central portions of said first and second panels being at least partially spaced apart from each other when said inflatable restraint is in the inflated condition to define an inflation fluid volume between said central portions of said first and second panels; and a plurality of stitching sections joining said central portion of said first panel to said central portion of said second panel at a plurality of spaced apart locations, each one of said plurality of stitching sections being spaced apart from the other ones of said plurality of stitching sections;

each one of said stitching sections enclosing a respective first section of said central portion of said first panel and a respective second section of said central portion of said second panel;

each one of said first sections overlying a corresponding one of said second sections when said inflatable restraint is in the inflated condition;

said stitching sections blocking flow of inflation fluid from said inflation fluid volume between said first sections of said first panel and said second sections of said second panel.

11. An inflatable restraint as set forth in claim 10 wherein said first section of said first panel is spaced from said second section of said second panel by a first predetermined distance when said inflatable restraint is in the uninflated condition, said first section of said first panel also being spaced from said second section of said second panel by said first predetermined distance when said inflatable restraint is in the inflated condition.

12. An inflatable restraint as set forth in claim 11 wherein said first section of said first panel is in abutting engagement with said second section of said second panel so that said first predetermined distance is approximately zero.

13. An inflatable restraint as set forth in claim 11 wherein said first section of said first panel is separated from said second section of said second panel by at least one reinforcing pad so that said first predetermined distance is approximately equal to the thickness of said at least one reinforcing pad.

14. An inflatable restraint as set forth in claim 10 wherein each one of said assemblies includes a first reinforcing pad sewn to and overlying said first section of said first panel and a second reinforcing pad sewn to and overlying said second section of said second panel, said first and second reinforcing pads being disposed intermediate said first and second sections, said first reinforcing pad overlying said second reinforcing pad, said stitching section joining said first and second reinforcing pads to said first and second sections.

15. An inflatable restraint as set forth in claim 10 wherein said stitching section comprises a series of stitches arranged in a circular pattern, each one of said first and second sections having a circular configuration.

16. An inflatable restraint as set forth in claim 10 wherein said inflatable restraint has a single continuous inflation fluid volume including a plurality of sections which are interconnected in fluid communication and between which said assemblies are disposed, said assemblies and said outer stitching section defining said plurality of inflation fluid volume sections.

17. An inflatable restraint as set forth in claim 16 wherein said sections of said inflation fluid volume which are disposed between adjacent assemblies, when inflated, have substantially the same thickness as said sections of said inflation fluid volume which are disposed between said assemblies and said outer stitching line.

18. An inflatable restraint as set forth in claim 10 wherein said assemblies are arranged spaced apart in a grid-like pattern over a body portion of said air bag.

19. An inflatable vehicle occupant restraint such as an air bag for, when inflated, protecting a vehicle occupant, said inflatable restraint having an uninflated condition and an inflated condition, said inflatable restraint comprising:

a first panel having a central portion and an outer peripheral portion;

a second panel having a central portion and an outer periphery portion;

said outer peripheral portions of said first and second panels being sewn together along an outer stitching line to join said first and second panels to form a body portion of said inflatable restraint;

said central portions of said first and second panels being at least partially spaced apart from each other when said inflatable restraint is in the inflated condition to define an inflation fluid volume between said central portions of said first and second panels;

a plurality of non-extensible assemblies disposed within said outer stitching line and joining said central portion of said first panel to said central portion of said second panel at a plurality of spaced apart locations to control the width of said inflation fluid volume as measured between said first and second panels, each one of said assemblies comprising:
(a) a first section of said central portion of said first panel;
(b) a second section of said central portion of said second panel;
a stitching section extending around and enclosing said first section and said second section, said stitching section joining said first section to said second section in an overlying relationship, said stitching section blocking flow of inflation fluid from said inflation fluid volume between said first section and said second section; and
a neck portion for connection with an inflation fluid source and a body portion for inflation into a position to protect the vehicle occupant, said neck portion having a plurality of fastener openings for connection with said inflation fluid source, said neck portion being free of said assemblies, said assemblies being disposed in said body portion of said inflatable restraint.

20. An inflatable vehicle occupant restraint such as an air bag for, when inflated, protecting a vehicle occupant, said inflatable restraint having an uninflated condition and an inflated condition, said inflatable restraint comprising:

a first panel having a central portion, an outer peripheral portion, an inner side surface and an outer side surface;

a second panel having a central portion, an outer peripheral portion, an inner side surface and an outer side surface;

said outer peripheral portions of said first and second panels being sewn together along an outer stitching line to join said first and second panels to form a body portion of said inflatable restraint, said inner side surface of said first panel being presented toward said inner side surface of said second panel;

said central portions of said first and second panels being at least partially spaced apart from each other when said inflatable restraint is in the inflated condition to define an inflation fluid volume between said central portions of said first and second panels;

a plurality of stitching sections joining said central portion of said first panel to said central portion of said second panel at a plurality of spaced apart locations, each one of said plurality of stitching sections being spaced apart from the other ones of said plurality of stitching sections;

each one of said stitching sections enclosing a respective first section of said central portion of said first panel and a respective second section of said central portion of said second panel;

each one of said first sections overlying a corresponding one of said second sections when said inflatable restraint is in the inflated condition;

said stitching sections blocking flow of inflation fluid from said inflation fluid volume between said first sections of said first panel and said second sections of said second panel; and a neck portion for connection with an inflation fluid source and a body portion for inflation into a position to protect the vehicle occupant, said neck portion having a plurality of fastener openings for connection with said inflation fluid source, said neck portion being free of said assemblies, said assemblies being disposed in said body portion of said inflatable restraint.

* * * * *